United States Patent [19]

Yu-Kuang

[11] 4,442,391
[45] * Apr. 10, 1984

[54] AUTOMATIC CONTROL SYSTEM FOR POSITION FOLLOWING AND RECIPROCATING MOTION OF A CONTROLLED OBJECT

[76] Inventor: Lee Yu-Kuang, No. 596, Chung Cheng Rd., Chu Pei, Hsing Chu Hsien, China

[*] Notice: The portion of the term of this patent subsequent to Feb. 10, 1998 has been disclaimed.

[21] Appl. No.: 192,690

[22] Filed: Oct. 1, 1980

[51] Int. Cl.³ .................................... G05B 11/06
[52] U.S. Cl. ............................... 318/663; 318/673
[58] Field of Search ............... 318/614, 624, 626, 663, 318/665, 673, 675, 676, 305, 257, 349; 308/666, 561; 338/116, 121, 89, 140

[56] References Cited

U.S. PATENT DOCUMENTS

| | | | |
|---|---|---|---|
| 1,268,712 | 6/1918 | Harle | 318/665 |
| 2,410,651 | 11/1946 | Glass | 318/663 |
| 3,241,015 | 3/1966 | Allen | 338/89 |
| 4,139,831 | 2/1979 | Ortlieb et al. | 338/140 |
| 4,159,445 | 6/1979 | Lee | 318/666 |
| 4,250,440 | 2/1981 | Lee | 318/614 |

Primary Examiner—David Smith, Jr.
Assistant Examiner—Eugene S. Indyk
Attorney, Agent, or Firm—Burns, Doane, Swecker & Mathis

[57] ABSTRACT

The present invention provides an automatic control system for position following and reciprocating motion of a controlled object. By using a specially designed controlling switch, and a pair of variable resistor for varying the position of the demanding object, the position of the controlled object and its motion pattern may be controlled. Using the automatic control system of the present invention, the motion characteristics of best deceleration rate for the controlled object may be obtained. And the automatic system of the present invention may improve the disadvantages of the conventional position control device contributes a perfectly ideal automatic control for the motor-operated or hydraulically-operated mechanism.

23 Claims, 20 Drawing Figures

AUTOMATIC CONTROL SYSTEM FOR POSITION FOLLOWING AND RECIPROCATING MOTION OF A CONTROLLED OBJECT

BACKGROUND OF THE INVENTION

1. Field of the Invention

The present invention relates to an automatic control system for position following and reciprocate motion of a controlled object.

2. Brief Description of the Prior Art

Before going into the description of the detailed background of the present invention, a feedback automatic control system is illustrated hereinbelow with reference to the block diagram of FIG. 1. FIG. 1 shows a block diagram of a feedback automatic control system wherein the numeral 01 represents the system controlled, 02 is a detecting means, 03 is the signal converting means, 04 is the comparing means and 05 is the controlling means. In this system, the controlled variable in the form of electric current is detected by the detecting means 02 from the system controlled 01. The controlled variable is converted into a certain related physical quantity by the signal converting means 03 and fed into the comparing means 04. The deviation value generated by the comparing means 04 is fed into the controlling means 05 as the manipulated variable for automatically controlling the system controlled 01 preserving at a presetted desired value.

It is easily understood that a controlled object to follow a demanding signal to move to a presetted position is usually necessary. For example, a high speed moving train must be decelerated before it comes to a stop for preventing the shock of the same and also to have an accurate stopping position.

Same requirements apply to the controlled object in a working machine. No matter the controlled object is to move to left or right, up or down, forward or backward, it always have a stopping position. And the controlled object must be started to decelerate before approaching the stopping position. Therefore, the conventional positioning mechanism in which the tool of drill will be automatically stopped at a presetted position comprises a high speed motor and a low speed motor. Referring to FIG. 2 which is an illustrative diagram of the relation between position and speed of a controlled object, point A is the presetted stopping position, B is a point before A. The controlled object moves with a high speed in a first period of distance a. Passing point B, a micro switch which is located at B is actuated to stop the high speed motor and the low speed motor begins to move to substitute the high speed motor. The controlled object decelerates in the second period of distance b and keeps a low speed y in the third period of distance c. When the controlled object arrives position A, another micro switch which is located at A is actuated to start a brake means and to stop the low speed motor and thus the controlled object comes to a stop at point C.

In view of the above description, because of the inertia, the controlled object always move beyond the presetted stopping position i.e. stops at point C rather than A, over shoot AC can not be avoid although the brake means is used. Besides, in said conventional positioning mechanism, a plurality of micro switches must be equipped in the mechanism. This will cause the complexity of the system. If the stopping position is to be changed, all the said microswitches must be detached and rearranged at a certain new position. This new rearrangement operation usually complicate and time consuming, and the system will be easily damaged. And this is the main disadvantage of a conventional working machine.

Hydraulic working machines have been well improved and employed by the factories in the recent days. Although there are many advantages for the hydraulic machines but the controlled object is moved with constant speed, the over shoot AC as stated in FIG. 2 still exists. Still it is necessary to equip with the system a micro switch at the desired stopping point. And the difficulty in rearranging the micro switches still exists. Some hydraulic machines use deceleration valves to achieve the deceleration. However this kind of machines must have a related dog for cooperating with the deceleration valve. If the dog is not precisely designed, the best deceleration for the controlled object can still not be obtained.

No matter to use micro switches or the deceleration valves which are usually presetted at the presetted point by a screw or other, if the stopping position is to be changed, the procedure for rearranging these micro switches or valves is much complicated and time consuming. Besides, due to the complexity of the oil passages for a working machine having deceleration valve, it always occupy a huge space and inconveniently operated. As the deceleration valve should be operated manally, it is impossible to be remote controlled or automatically controlled.

Recently, hydraulic servo mechanism the controlled object will follow the demanding signal quickly, such as servo valve has been developed for ships and airplanes to control the aviation direction in turn of the driving wheel operated by the pilot. This kind of servo valve is difficult in manufacture and maintenance due to its complicated mechanical structure. Besides, using a small electric signal to control a very heavy load or a small movement of the flapper to cause a large distance movement of the controlled object, its transfer function is too high to keep a stable and accurate control.

The said disadvantages of the motor-operated machine or hydraulic machine are the ones to be obviated by the present invention.

In another respect, in many machines such as drilling machine the drill must be quickly approached to the object to be drilled for saving time (Rapid Approach); and then drill with a certain steady speed (Feed); and then drill with a relatively low speed when the drilling is almost completed (Fine Feed); and return with a high speed in order to save time (Rapid Return). And this operation continues reciprocatically. In other words, the knife move to and fro for a cycle and can be deemed as a reciprocating motion of a controlled object between two positions.

The automatic reciprocating motion may be divided into several types. (1) Constant speed type: The moving rate keeps constant from the starting position to the end position. (2) End deceleration type: the moving object decelerates at the end position for preventing shock and also for changing moving direction easily. (3) Variation speed type: The speed of the moving object may be adjusted at each points on to and fro path for the purpose of requirement (necessary). (4) Rapid return type: to return quickly from end point to starting point such as the said drilling machine.

The conventional machines actuated by constant speed motor or hydraulic machine using mechanical mechanisms such as cams for changing the moving speed during the reciprocating motion. If different type of speed is required for a moving object during the reciprocating motion different mechanical mechanism is to be manufactured the design for the mechanical mechanisms must be so complicated that cause noisy and damages. Further, the power transmission in said mechanical mechanisms depends on the point or line contact transmission thus the output power is limited.

BRIEF SUMMARY OF THE PRESENT INVENTION

The main object of the present invention is to obviate the disadvantages of the conventional working machines and to provide a reversible motor (or Ward Leonard System) or hydraulic machine equipped with electro magnetic flow control valve on the oil passage to control the moving speed of controlled object, so that the stopping position of the controlled object can be effectively controlled.

Another object of the present invention is setting of stopping position of controlled object may be achieved only by changing the strength of input current. Therefore the object may be remote controlled or automatically controlled by present invention cooperating with numerical control machine or other machine.

Still another object of the present invention is to provide a reversible and speed variable motor (or Ward Leonard System) or hydraulic machine with electromagnetic flow control value as the manipulating means of the automatic control system for reciprocating motion of a controlled object.

Further object of the present invention is to provide a variable resistor with the change of the slide contact position of the resistor, the presetted stopping position may be easily changed. Therefore it will not be necessary to rearrange the micro switches deceleration valve in the conventional machines. And a best deceleration and precise stopping position may be obtained.

Still further object is to provide an electromagnetic flow control valve in the hydraulic machine. By changing the slide contact position on the variable resistor, the presetted stopping position may be easily changed. And there will not be necessary to use mechanical mechanisms such as dogs. And a precise stopping position may be obtained, also remote or automatical control can be practised.

Another object of the present invention is to provide a controlling switch by adjusting the resistance to modulate the flow rate of the flow control valve and the cross sectional area of the oil passage to increase or decrease the speed of the controlled object and make the same to stop by following the demanding signal. This will contribute a hydraulic servo mechanism which is simple in structure and operation, easy to maintenance, less influence by the variation temperature or pressure of the hydraulic oil and a very low transfer function. Using this invented hydraulic servo mechanism, a precise position and speed control may be obtained.

Still another object of the present invention is to use a reversible and speed variable motor (or Ward Leonard System) or hydraulic machine with electromagnetic flow control valve to control the movement speed reciprocating motion of a controlled object between two positions without using any mechanical mechanisms. The speed of the controlled object at each position during the reciprocating motion may be varied only by adjusting the variable resistance of the resistor in the controlling switch. Because of no friction, there will be no noise and less damages, and still large output power can be obtained.

Those and other objects, features, and advantages will become apparent from the following detailed description of the preferred embodiments with reference to the accompanying drawings, wherein:

DETAILED DESCRIPTION OF THE PREFERRED EMBODIMENT

The inventor of the present invention has filed a patent application entitled "Multiple-Purpose Automatic Control System" with Ser. No. 823,462 now under examination. Said invention provided an automatic control method and apparatus for various physical quantities such as rotation speed, torque, power, voltage, current, temperature, pressure, liquid surface, etc.

The present invention enbroads the scope of application of said prior invention especially on the physical quantities of position and angle. The main object is to make the controlled object follow a demanding signal or demanding object to stop at a presetted position with quickness and stability and have any desired speed during the path of a reciprocating motion.

To facilitate the better understanding, the same means appeared in present application has a same numeral representation as that in said prior application.

Figure 3:
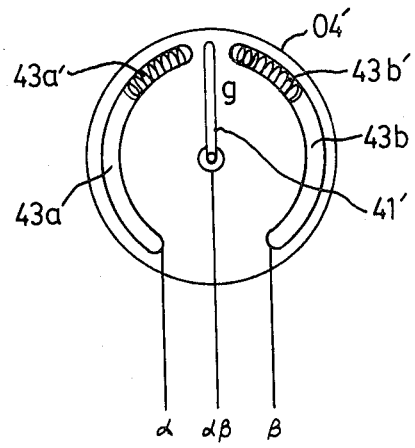
FIG. 3 is an illustrative diagram of an embodiment of the controlling switch.
Figure 4:
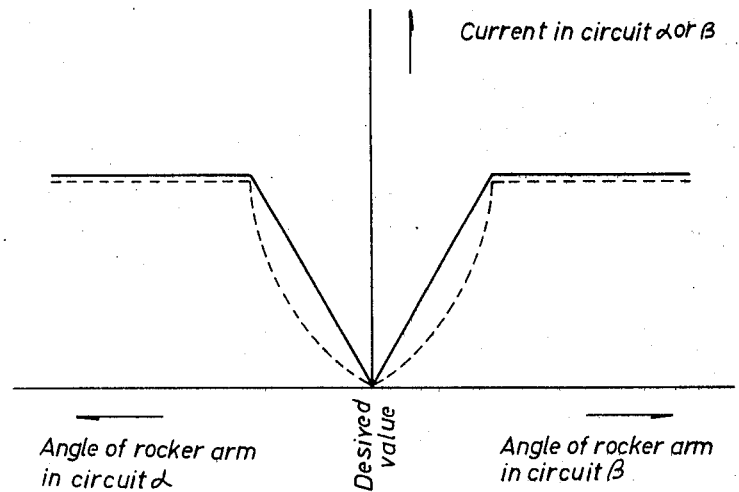
FIG. 4 is a diagram showing the relation between the angle of rocker arm and the current of the forward or reverse rotation controlling circuit of the motor.
Figure 12:
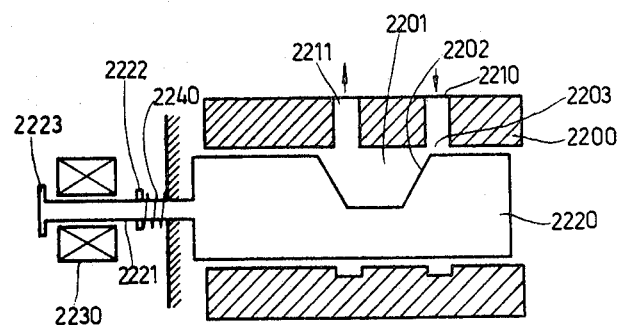
FIG. 12 is a sectional view of an electromagnetic flow control valve.

As stated in the prior application, the feedback control system comprises a comparing means 04 whose structure and operation mechanism has been described in FIG. 12 of the prior application. The comparing means is further shown in FIG. 3 of the present application for better understanding. The comparing means 04 comprises a pair of symetric arc conductors 43a, 43b and a rocker arm 41' wherein said conductors 43a, 43b further comprises a section of variable resistor 43a', 43b' near the gap g. When the rocker arm 41' touches the conductors 43a, 43b, the current in the forward backward rotation controlling circuit ($\alpha$) ($\beta$) keeps constant. When the rocker arm 41' moves on the variable resistors 43a' or 43b', the current in circuit ($\alpha$) ($\beta$) decreases linearly because the resistance of resistor 43a' or 43b' varies linearly. The relation between the angle of the rocker arm 41' and the current in circuit ($\alpha$) or ($\beta$) is best shown as the full line in the diagram of FIG. 4.

Figure 5:
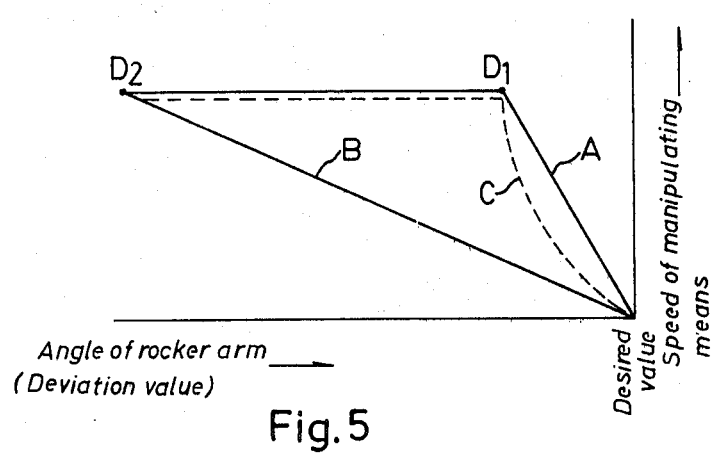
FIG. 5 is a diagram showing the relation between the angle of rocker arm and the speed of the manipulating means.
Figure 6:
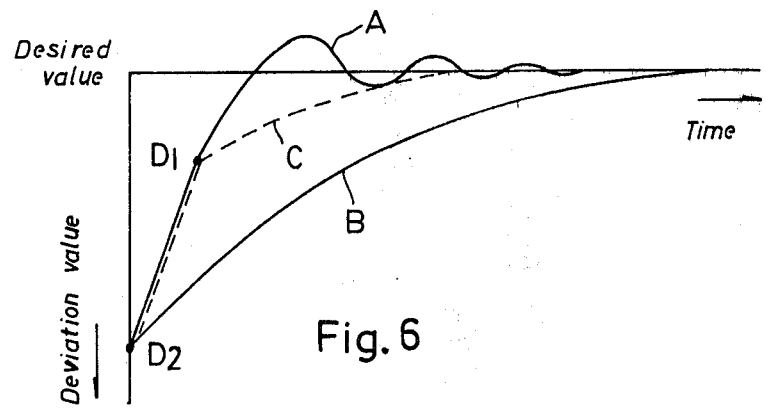
FIG. 6 is a diagram showing the relation between the deviation value and the time.

Referring to FIGS. 5 and 6 which show the relation of the deviation of position between controlled object and presetted desired value and the speed of manipulating means and time respectively, if the rocker arm of the controlling switch starts to decrease the input voltage at position D1 and to make the rotation speed of motion starts to decrease and become zero at the desired value point, the time for the controlled object to reach the desired value is short thus the slop is large as represented by the line A in FIG. 5 the over shoot of controlled object is large and ossilation occurs. The response for the controlled variable is represented by the line A in FIG. 6. If the rocker arm of the controlling switch starts to decrease the input voltage at position D2, the time for the controlled object to reach the desired value is long thus the slop is small as represented by the line B in FIG. 5. No over shoot and ossilation occurs but the response time is very long as shown the line B in FIG. 6. Both said conditions are not ideal for the controlled object to reach a presetted desired value, one is too quick in response time but ossilation happens, the other although is steady but too long in response time.

Figure 1:
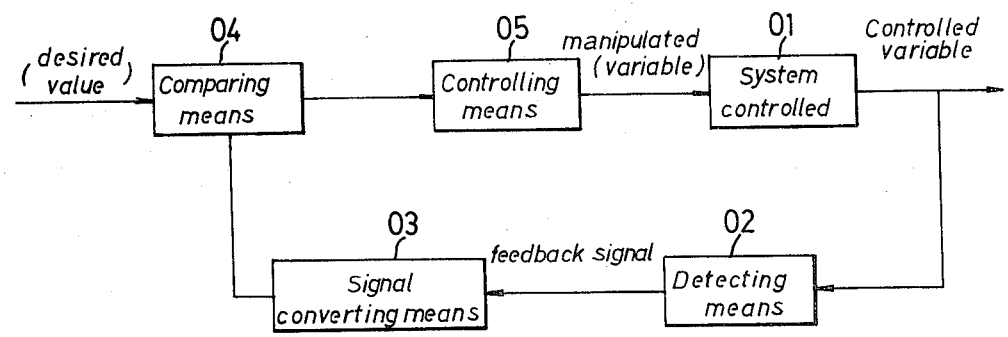
FIG. 1 is a block diagram of a feedback automatic control system.
Figure 2:
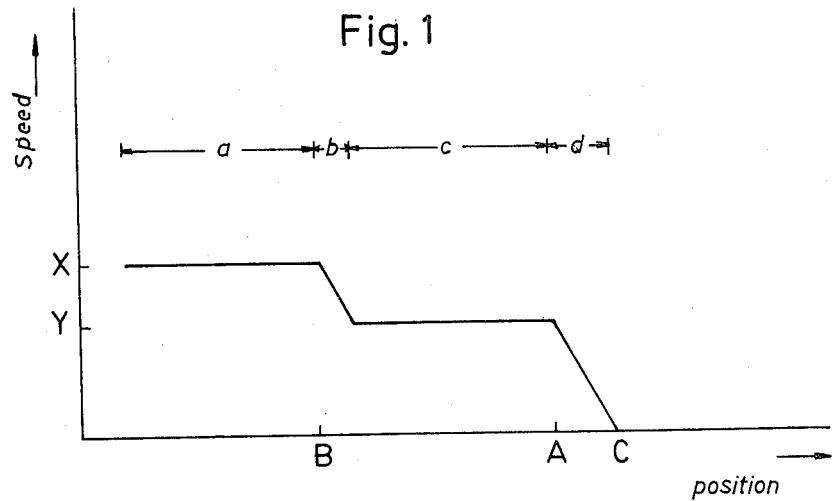
FIG. 2 is a diagram showing the relation between position and speed of a controllid object.
Figure 7:
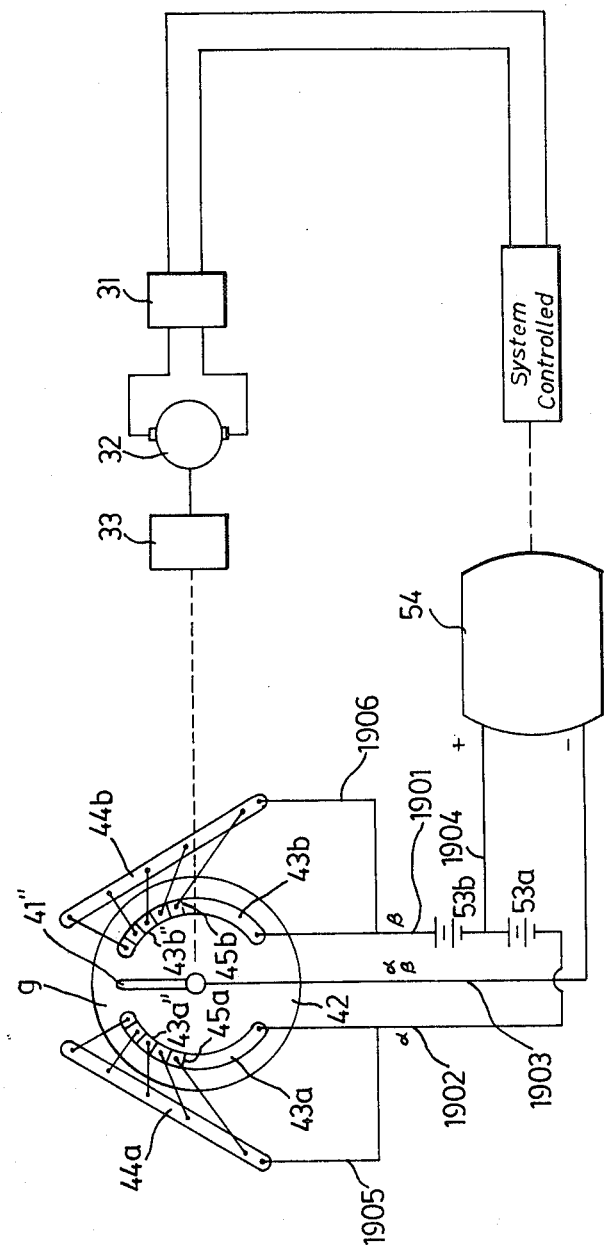
FIG. 7 shows an illustrative diagram of the best deceleration controlling switch and the circuit diagram of position automatic control system driven by a motor.

To improve the disadvantages of said two conditions, the present invention provides a controlling switch by substituting the variable resistor 43a', 43b' with a pair of slide contacting plates 43a'', 43b'' which is shown in FIG. 7. FIG. 7 is the same drawing as FIG. 2 in the prior application entitled "Multiple-Purpose Automatic Control System" except the controlling switch has been taken placed by the one according to the present invention. The controlling switch in FIG. 7 comprises a rocker arm 41'', a pair of arc conductors 43a, 43b wherein said arc conductors 43a, 43b are formed into a plurality of slide contacting plates 43a'', 43b'' insulated with each other with insulating plates 45a, 45b near the gap, and every slide contacting plate on 43a'', 43b'' having lead wires connecting to proper place on a pair of resistor 44a, 44b.

A wire 1902 connects the resistor 44a and the conductor 43a to the negative of a power source 53a. A wire 1901 connects the resistor 44b and the conductor 43b to the positive of the power source 53b. A wire 1903 connects the rocker arm 41'' to the negative terminal of a reversible motor 54 and a wire 1904 connects the lead wire between power sources 53a, 53b to the positive terminal of the reversible motor 54. When the controlled object varies with the rotation of the motor 54, the electric signal of the controlled variable will be amplified by the amplifier 31, actuating the servo motor 32 and driving the rocker arm 41'' to move leftward or rightward through the reduced gear means 33. The system in FIG. 7 of the present invention is identical to FIG. 2 of the prior application except by eliminating the safety switches 56a, 56b, braking means 52 and the relays 51a, 51b to facilitate the better understanding.

When the controlled variable deviates from the desired value, the rocker arm 41'' rotates leftward or rightward. When rocker arm 41'' touches the slide contacting plates 43a'', the electric circuitry will be: positive terminal of power source 53a→motor 54→wire 1093→rocker arm 41''→slide contactingg plates 43a''→resistor 44a→wire 1905→wire 1902→negative terminal of power source 53a forming a forward rotation controlling circuit briefly donated as ($\alpha$). When rocker arm 41'' touches slide contacting plates 43b'', the electric circuitry will be: positive terminal of power source 53b→wire 1901→wire 1906→resistor 44b→slide contacting plate 43b''→rocker arm 41''→wire 1903→motor 54→negative terminal of power source 53b forming a reverse rotation controlling circuit briefly donated as ($\beta$). Because each slide contacting plate 43a'', 43b'' connected to different position of the resistor 44a, 44b, when the rocker arm 41'' moves along the plates 43a'', 43b'', the current strength in circuit ($\alpha$) or ($\beta$) varies accordingly.

If the rocker arm 41'' touches the conductors 43a or 43b, the circuit ($\alpha$) or ($\beta$) does not pass the resistors 44a or 44b, therefore the current in circuit ($\alpha$) or ($\beta$) remain constant and so does the rotation speed of the motor. Only when the rocker arm 41'' begins to touch the slide contacting plates 43a'' or 43b'', the current strength decreases as the resistance increases, the motor will be decreased in speed.

If properly adjusting the connecting position of the resistor 44a, 44b with each of the slide contacting plate 43a'', 43b'', the characteristic of the relation of motor speed and position deviation may be nonliner. Referring to FIG. 5, the motor speed decreases rapidly at position D1, but slowly at the desired value position as represented by the dotted line C. It can be easily understood that the motor speed is relatively low at the desired value like the line B in FIG. 5 the over shoot is small, thus little ossilation shall occur, the characteristic of the speed may be said that the speed of motor is as quick as line A before D1, as slow as line B at desired value. And the time response curve is shown by the dotted line C in FIG. 6. Therefore, by properly connecting each slide contacting plate 43a'', 43b'' to the proper position of resistors 44a, 44b, the motion pattern of the controlled object will have an optimun deceleration when approaching the desired value and no ossilation shall occur.

Figure 8:
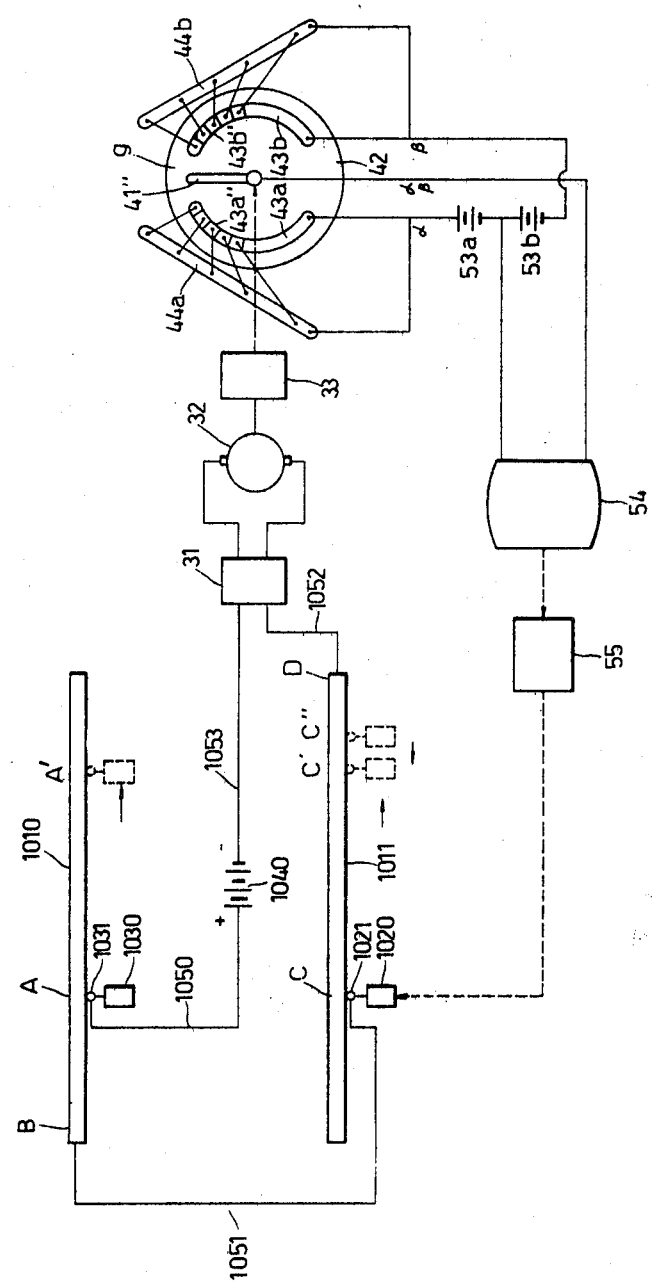
FIG. 8 shows a circuit diagram embodiment for position following using the best deceleration controlling switch.

Referring to FIG. 8 which shows the circuit of an embodiment of position following using the best deceleration controlling switch in FIG. 7, the purpose for this system is using reversible and speed variable motor as manipulating means to make the controlled object follow the demanding object and there will be no shock by automatically decreasing the speed when approaching the position of the demanding object. In the application of position following, there is provided a pair of resistor 1010 and 1011 wherein 1011 is slidably connected by a contacting plate 1021 of the controlled object 1020 and the resistor 1010 is slidably connected by a contacting plate 1031 of a demanding object 1030. As shown in the figure, when the controlled object 1020 is at the corresponding position with the demanding object 1030, the current of the power source 1040 will be directed from the positive terminal thereof through a wire 1050, the contacting plate 1031 of the demanding object 1030, point A of the resistor 1010, end point B of the resistor 1010, wire 1051, contacting plate 1021 of the controlled object 1020, point C of the resistor 1011, end point D of the resistor 1011, wire 1052 and input to the amplifier 31 of the signal converting means 03 in the FIG. 2 of prior application. The negative terminal of the power source 1040 is also led to amplifier 31 through wire 1053. The input signal for the amplifier 31 will be amplified to drive the rocker arm 41" of the controlling switch 42 to rotate leftward or rightward through a reduced gear means 33 and servo motor 32.

When the controlled object 1020 is at the corresponding position of the demanding object 1030, the rocker arm 41" will stay at the position of the gap g and the current fed into the amplifier 31 equals the voltage of the power source 1040 devided by the resistance of section AB and CD on resistor 1010 and 1011.

If the demanding object 1030 is moved from position A to position A' by any method, the current fed to the amplifier 31 changes to a value of voltage of the power source 1040 divided by the resistance of section A'B+CD on the resistors 1010 and 1011. As the resistance increase, the current is lowered. The rocker arm 41" shall rotate leftward causing the foward rotation controlling circuit ($\alpha$) to be closed. The manipulating motor 54 in the FIG. 2 of said prior application starts to rotate forward and drives the controlled object 1020 to a new position C' through a reduced gear means 55. Until the resistance of A'B+C'D equals to that of AB+CD, the rocker arm 41" again backs to the gap and circuit ($\alpha$) is (OPEN), the motor 54 stops turning. The controlled object 1020 completes the following to the demanding object 1030.

With reference to FIG. 8 one can easily understand that the motion pattern of speed of the controlled object 1020 approaching point C' depends on the connection of slide contacting plates 43a", 43b" to the different position on the resistor 44a, 44b of the controlling switch 42. In other words, the controlled object 1020 is moved quickly toward point C", when near to point C' the rocker arm 41" will touch on slide contacting plate 43a", the current in circuit ($\alpha$) decreases and the relation of motor speed and position deviation is like the dotted line C nature in FIG. 5. No shock or ossilation occur, an optimum deceleration is aquired. Besides, the method for connecting the slide contacting plates 43a", 43b" to the resistors 44a, 44b is very simple and so does their adjusting.

If the controlled object 1020 passes over the position C' to a new position C", the resistance A'B+C"D will be smaller than AB+CD and the current fed to amplifier 31 will become larger. The rocker arm 41" of the controlling switch 42 shall touch the slide contacting plates 43b" and the reverse rotation controlling circuit ($\beta$) will be closed making the motor 54 start to rotate reversely thus draw back the controlled object 1020 from position C" to C' where the resistance of A'B+C'D equals that of AB+CD motor stops, no over shoot is produced, accurate position control is obtained. From the description hereinabove, it is understood that the automatic control system for position following of the present invention does not have to use the braking means the over shoot AC in FIG. 2 of the conventional position mechanism will not be produced. All what one should do is to move the demanding object 1030 to the desired position, and the controlled object 1020 shall follow to the corresponding position automatically without shock and ossilation. It will not be necessary to rearrange the micro switches like the conventional machines.

Figure 9:
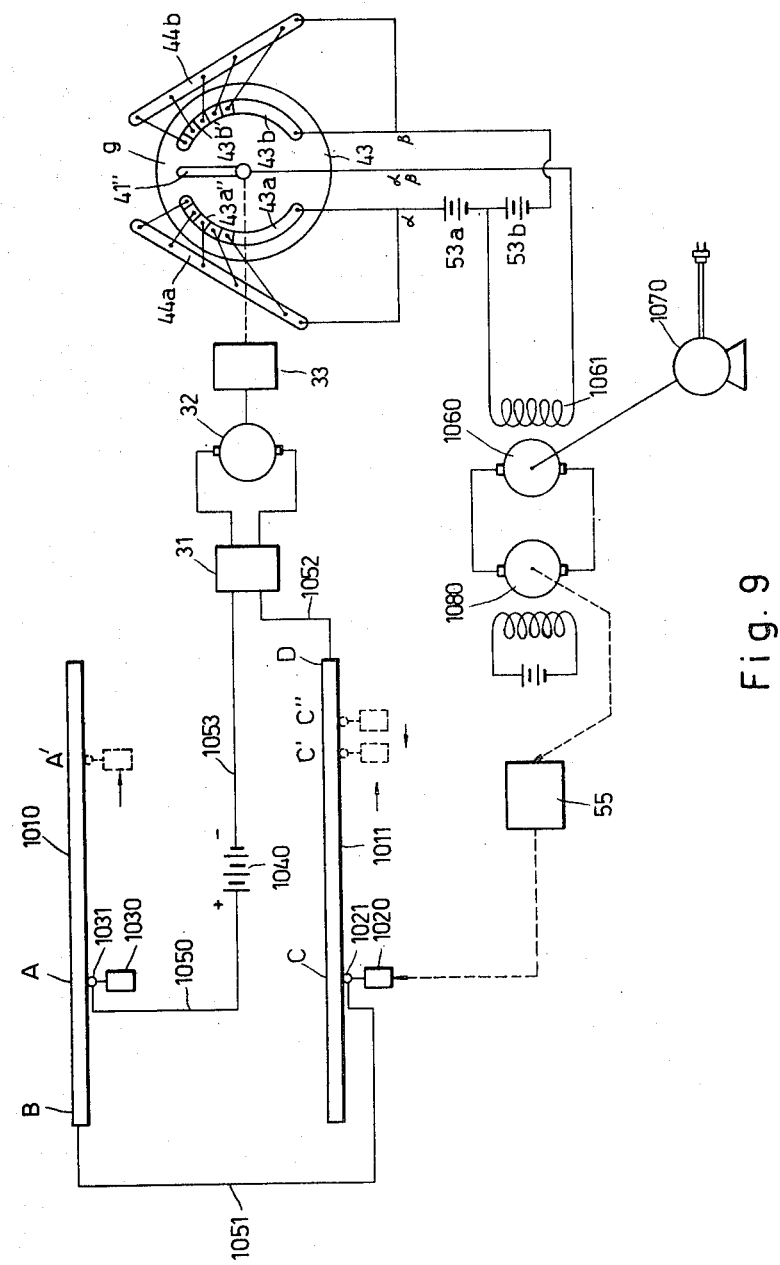
FIG. 9 shows a circuit diagram using Ward Lenord System.

In order to have a larger output power or manipulating power, an embodiment of Ward Leonard System is employed to the system of the present invention as shown in FIG. 9. The purpose of the Ward Leonard Systems is to enlarge the power of the manipulating means (it is usually a reversible motor). The forward (reverse) rotation controlling circuit ($\alpha$) ($\beta$) is connected to the excitation wind field 1061 of the generator 1060 which is driven by another motor 1070. Said generator 1060 generates electric power feeding into the motor 1080 which in turn drive the controlled object 1020 through the reduced gear means 55. The embodiment in FIG. 9 has a same operation theory to that of the system in FIG. 8, it is therefore not detailed. However, it is still to be noticed that the Ward Leonard System in FIG. 9 is only one example, other types of Ward Leonard System may also apply to the system of FIG. 8.

Hereinbefore, we have described the system of position following which has a reversible motor as the manipulating means. Actually, we can choose hydraulic manipulating means in the system of the present invention which may be seen as an embodiment in FIG. 10. The purpose of this system is to use a hydraulic cylinder to drive the controlled object following the demanding object. In the present embodiment the controlled object is moved in constant speed, the movement of the controlled object has no deceleration because there is no flow control valve. This system is similar to the one in FIG. 8 except the manipulating means is the cylinder in stead of a reversible motor. The cylinder and the pilot valve can be referred to the FIG. 10 of the prior application entitled "Multiple-Purpose Automatic Control System". Besides, the controlling switch is not the one used in the system of FIG. 8. But, rather, the controlling switch 04 used in FIG. 10 of the said prior application.

Figure 10:
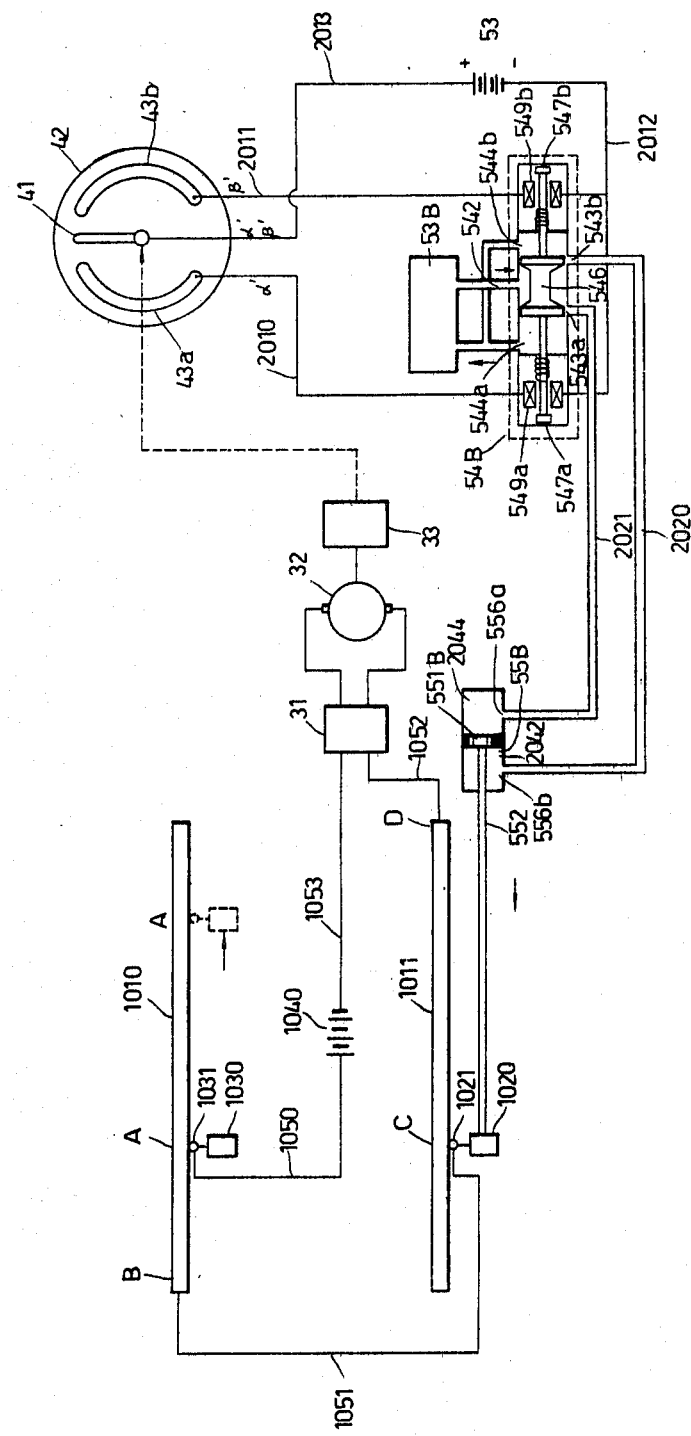
FIG. 10 shows a circuit diagram embodiment for position following using hydraulic manipulating means.

Reference is made to FIG. 10, the arc conductors 43a, 43b of the controlling switch 04 in FIG. 10 of the said prior application have wires 2010, 2011 connecting to the positive terminals of solenoids 549a, 549b. The negative termanal of solenoids 549a, 549b have a wire 2012 to the negative terminal of the power source 53. The positive terminal of the source 53 is led to the rocker arm 41 of the controlling switch 04 t through wire 2013. This forms a hydraulic forward movement circuit ($\alpha'$) and reverse movement circuit ($\beta'$). When the demanding object 1030 moves rightward, the current fed to the amplifier 31 of the signal converting means (03) in FIG. 10 of said prior application decreases and the rocker arm 41 rotates leftward thus the circuit ($\alpha'$) is closed. Solenoid 549$a'$ conducts current making an attraction to the head portion 547$a$ making the piston 546 of the pilot valve 54B move rightward hydraulic oil shall flow from oil tank 53B→oil inlet 542→pilot valve→oil outlet 543$b$→oil passage 2020→oil inlet 556$b$ of cylinder 55B→left chamber 2042 of cylinder 55B→drive the piston 551B→oil in the right chamber 2044 of the cylinder 55B→oil outlet 556$a$ of cylinder 55B→oil passage 2021→oil inlets 543$a$, 544$a$→oil tank 53B forming the oil forward movement passage. The piston rod 552 of the cylinder 55B in FIG. 10 of said prior application will drive the controlled object 1020 to move rightward until it comes to a stop at a position corresponding to the demanding object 1030. And the rocker arm 41 of the controlling switch 04 backs to the gap g position the circuit ($\alpha'$) becomes opened thus none of the solenoids 549$a$, 549$b$ canducts current. The controlled object 1020 remains stops.

In a similar operation, if the demanding object 1030 is moved to the left, the rocker arm 41 will touch the arc conductor 43$b$ making the hydraulic reverse movement circuit ($\alpha'$) to be closed. The solenoid 549$b$ of the pilot valve 54B starts to conduct current making the piston 546 thereof moves leftward. The hydraulic oil will flow in the reverse movement passage and the piston rod 552 of the cylinder 55B drives the controlled object 1020 to the left until it comes to a stop corresponding to the position of the demanding object.

From the above described condition, one may only move the demanding object 1030, the hydraulic forward or reverse movement circuit ($\alpha'$) or ($\beta'$) will be closed and the piston rod 552 of the piston 551B in cylinder 55B will automatically drive the controlled object 1020 to move left or right. We may have a very steady and accurate position following control without the need in rearranging the micro switches.

Because the controlling switch 04 in the system of FIG. 10 adopts arc conductors 43$a$, 43$b$, it has no deceleration features. The controlled object 1020 shall move with constant speed during its motion. If deceleration in approaching the desired valve is needed, we may adopt various kinds of flow control valves to control the movement speed of piston in cylinder to achieve the goal. Therefore before going any further, we shall introduce the structure and operation theory of the flow control valve.

Figure 11:
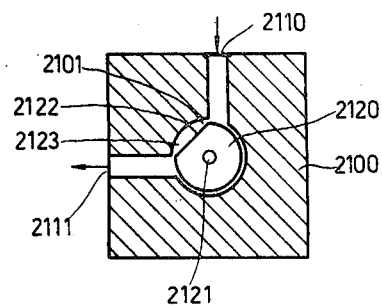
FIG. 11 is a sectional view of a mechanical flow control valve.

Referring to FIG. 11 which shows a sectional view of a mechanical flow control valve, its purpose is to change the oil flow rate by changing the angle of the valve shaft in accordance with the input power signal. The valve comprises a valve body 2100, an oil inlet 2110, oil outlet 2111, and a valve dwell 2120 situated in the valve chamber 2101 which is in the certer of valve body 2100. The valve dwell 2120 is substantially in the shape of a cylinder having a shaft 2121 protruding out of the valve body 2100 and connecting to the rotation axis of the servo motor. One side of the valve dwell 2120 forms a plane 2122 shaping an oriffice 2123 with respect to the valve chamber 2101. The magnitude of oriffice 2123 will be adjusted when the valve dwell 2120 rotates toward left or right in the valve chamber 2101 and the outgoing flow rate from the oil outlet 2111 will be controlled.

Another kind of flow control valve is an electromagnetic flow control valve and shown as a sectional view in FIG. 12. The purpose of this kind of valve is to adjust the magnitude of oriffice to control the oil flow rate by changing the attractive force of a solenoid which is according to the change of input power signal. The valve comprises a valve body 2200, a pair of inlet and outlet 2210, 2211, and a valve rod 2220 provided in the valve body 2200 with the left end thereof formed into a narrow portion 2221 and passing out of the valve body 2220. The tip of the valve rod 2220 forms into a head portion 2223 and the narrow portion 2221 happens to pass a solenoid 2230. The head portion 2223 and the narrow portion 2221 are made of ferromagnetic materials. Therefore, when the solenoid 2230 starts to conduct electric current, the attractive force will attract the head portion 2223 causing the valve rod 2220 moving rightward in the valve body 2220. The ring 2222 on the narrowed portion 2221 will press a spring 2240 to a contrasted state. If the electric current in the solenoid 2230 stops, the valve rod 2220 will be back to its original position due to the actuation of the spring 2240. There is provided a notch 2201 on the valve rod 2220 forming a side face 2202. When the valve rod 2220 moves toward rightward or leftward, the magnitude of oriffice 2203 between the oil inlet 2210 and the side face 2202 will be adjusted. Usually the rod 2220 will stop at a position where the attractive force of the solenoid 2230 and the restoring force of the spring 2240 are equal. Thus the flow rate of the hydraulic oil is controlled by the input electric signal of the solenoid 2230 and the movement speed of piston in cylinder is controlled.

Figure 13:
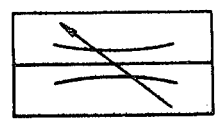
FIG. 13 is the symbol or representation of a flow control valve.

The flow control valve, no matter it is mechanical type or electromagnetic type, is represented by a symbol shown in FIG. 13.

After describing the structure and operation of the flow control valve, one can easily understand that by adopting two flow control valves in the oil passages 2020, 2021 to control the oil flow rate in or out of the cylinder 55B in FIG. 10 that the speed of piston 551B will be controlled and the moving of the controlled object 1020 will have deceleration when it approaches the desired valve or the position of the demanding object 1030.

Figure 14:
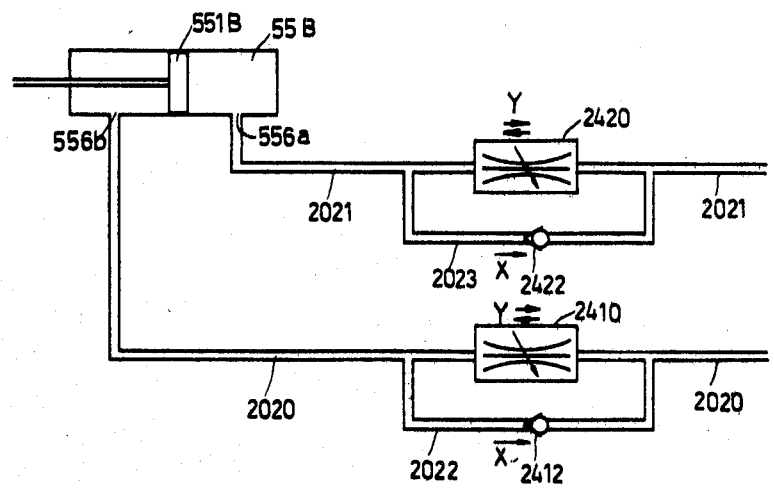
FIG. 14 is a diagram showing the control of a hydraulic cylinder by a flow control valve.

FIG. 14 is an oil passage diagram to control the speed of piston in cylinder by adjusting the flow rate of hydraulic oil using a pair of flow control valves. To control the oil flow rate into the oil cylinder by adopting a flow control valve on the oil passage into the cylinder is called meter in control. Referring to FIG. 14, a pair of flow control valves 2410, 2420 are equipped on the oil passages 2020, 2021 by a check valve 2412, 2422 on the branch passages 2022, 2023. The flow control valve 2410, 2420 may flow oil in either direction Y while the check valves 2412, 2422 can only flow oil in the direction X.

If hydraulic oil is flowing from the oil passage 2021 into the cylinder 55B, the check valve 2422 on passage 2023 blocks and all the oil flows through flow control valve 2420 and the oil path is as below:

pass 2021→flow control valve 2420→oil let 556$a$→cylinder 55B→oil let 556$b$→

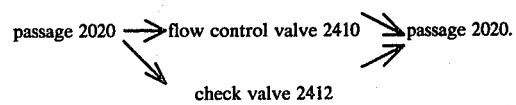

In the similar condition, if oil flows into the cylinder from the passage 2020 the oil is blocked by the check valve 2412 on passage 2022 then the oil flows in the path below:

passage 2020 ⟶ flow control

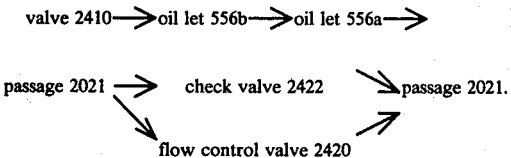

The above stated two conditions are meter in control.

If the flow rate of oil which flows out of the cylinder is to be controlled, it can be easily achieved by reversing the direction of the check valves 2412 and 2422 making the X direction stands for the block direction, oil will be blocked. The oil flow path will be:

passage 2020 ⟶ flow control valve 2410 ↘ oil let 556b ⟶

↘ check valve 2412 passage 2021 ⟶ flow control valve 2420

(oil is blocked by the check valve 2422 on passage 2023) ⟶ passage 2021 and is the condition of meter out control.

Figure 15:
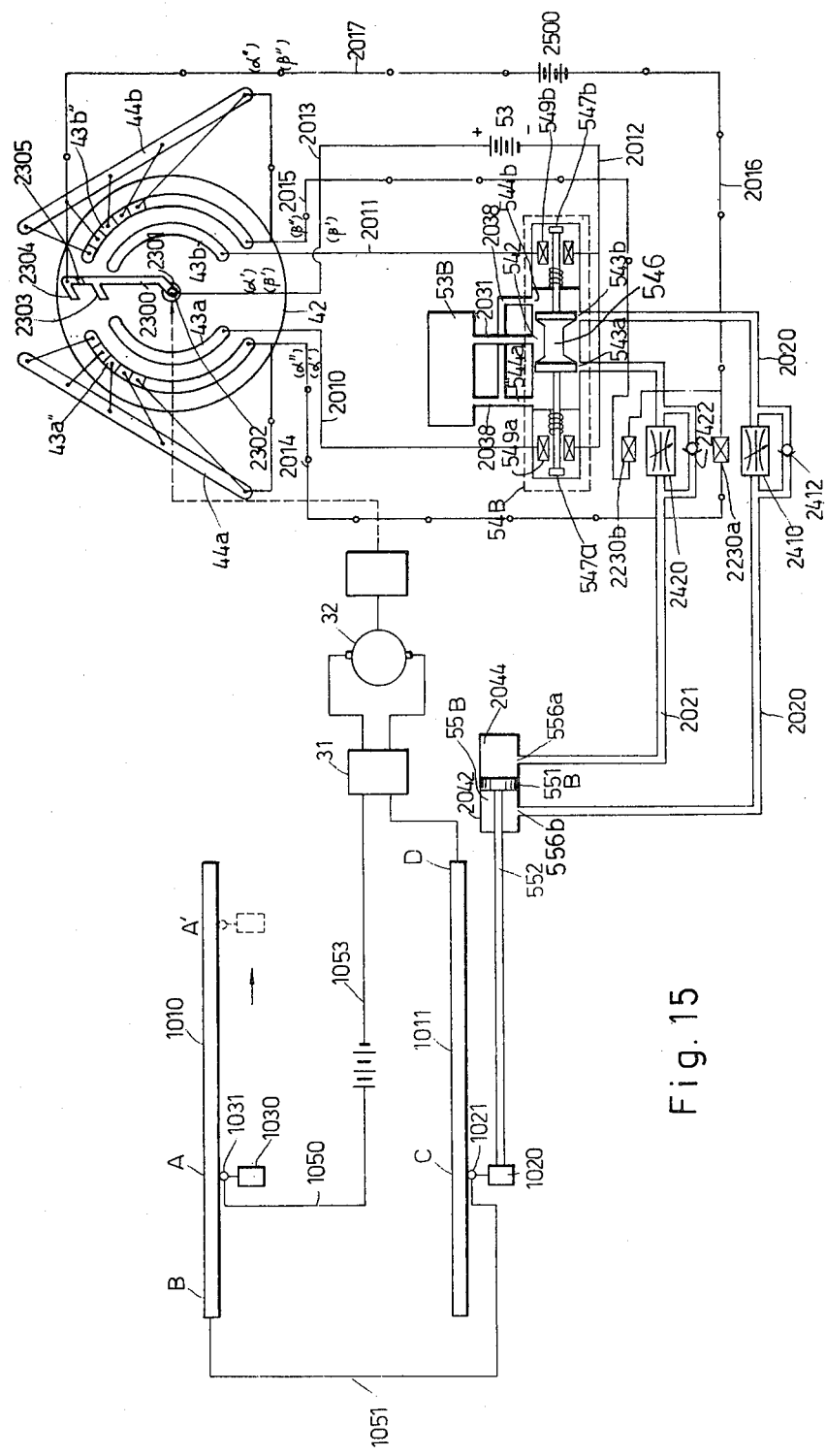
FIG. 15 shows a circuit diagram embodiment for position following using the best deceleration controlling switch of the present invention and the hydraulic manipulating means.

FIG. 15 shows a system adopting an electromagnetic flow control valve to control the oil flow rate of the oil into the cylinder thus control the speed of the piston in the cylinder. Because the flow rate is adjusted when the controlled object approaches the desired position, it may have an end deceleration and shocks may be eliminated. Structurally speaking, the system in FIG. 15 is a combination of that in FIGS. 10 and 14 equipping the flow control valves and check valve to the oil passages 2020 and 2021 to control the hydraulic oil flowing in or out of the cylinder 55B and in turn to control the movement speed of the piston 551B.

The hydraulic forward (reverse) movement circuit (α') [(β')] and the operation of the pilot valve 54B have already been described with reference to FIG. 10. And the flow control valve is controlled electromagnetically as described below. The controlling switch 42 in FIG. 15 is a specially designed one. Outside of the conductor 43a, 43b of controlling switch 42 in FIG. 10, a pair of slide contacting plate 43A", 43B" as described in FIG. 7 or 8 is provided. The E type rocker arm 2300 has three pivot points wherein the first one 2301 passes the central hole 2302 of the controlling switch 42 as the rotation axis, the second pivot point 2303 moves on the conductors 43a, 43b acting as the switch contacts of the circuits (β') and (β'), and the third pivot point 2304 insulated from the second pivot point 2303 by an insulating plate 2305 moves on the slide contacting plates 43a", 43b" acting as the switch contact of the hydraulic forward (reverse) movement flow controlling circuit (α"), (β"). The slide contacting plates 43a", 43b" have wires connected to the resistors 44a, 44b.

There are wires 2010 and 2011 connecting the conductors 43a, 43b to the positive terminals of solenoids 549a, 549b. And the negative terminals of the solenoids 549a, 549b are connected to the negative terminal of the power source 53 through a wire 2012. And wire 2013 connected the positive terminal of the power source 53 to the first pivot point 2301. This completes the hydraulic forward movement controlling circuit (α') and the hydraulic reverse movement controlling circuit (β').

There are wires 2014, 2015 connecting the resistors 44a, 44b to the positive terminals of solenoids 2230a, 2230b of the flow control valves 2410, 2420 described in FIG. 12 on the passages 2020 and 2021. The negative terminals of the solenoids 2230a, 2230b are connected to the negative terminal of the power source 2500 through a wire 2016. And the positive terminal of the power source 2500 is connected to the third pivot point 2304 of the E type rocker arm 2300 through a wire 2017. This completes the hydraulic forward movement flow controlling circuit (α") and the hydraulic reverse movement flow controlling circuit (β") preferably shown in

− ∘ − ∘ − ∘ − .

When the demanding object 1030 moves to the right, the E type rocker arm rotates to the left, the second pivot point 2303 will touch the conductor 43a, the third pivot point 2304 will touch the slide contacting plate 43a" simultaneously. The forward movement circuit (α') and the forward movement flow controlling circuit (α") are closed simultaneously. The solenoids 549a in pilot valve 54B and the solenoid 2230a in flow control valve 2410 conduct current simultaneously head 547a will be attracted by solenoid 549a and piston 546 will be shifted to rightward. The oil path will be:

oil tank 53B ⟶ passage 2031 ⟶ oil inlet 542 ⟶ oil outlet 543b ⟶ passage 2020 ⟶ flow control valve 2410

(oil is blocked by check valve 2412) ⟶ oil inlet 556b of cylinder

55B ⟶ left chamber 2042 of cylinder ⟶ piston 551B ⟶ oil in the right chamber 2044 of the cylinder ⟶ oil outlet 556a ⟶

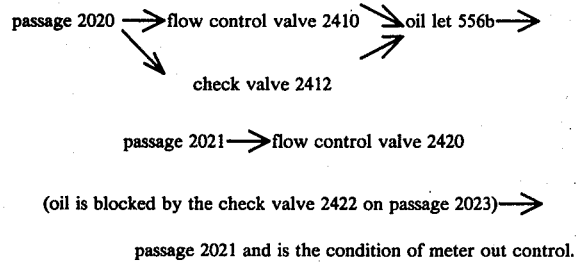

544a ⟶ passage 2038 ⟶ oil tank 53B forming the hydraulic oil forward flow movement.

The piston rod 552 will drive the controlled object 1020 to move rightward. Because each slide contacting plates 43a" are connected to the different position on the resistor 44a, when the third pivot point 2304 of the E type rocker arm 2300 touches different slide contacting plates 43a", the current strength passing the solenoid 2230a of the flow control valve 2410 as described in FIG. 12 changes accordingly, and the attractive force of solenoid 2230a will change also correspondingly. The magnitude of oriffice 2203 in the flow control valve 2410 changes thus controlling the oil flow which goes in or out of the cylinder and the movement speed of piston 551B is controlled.

When the demanding object 1030 moves to the left, the E type rocker arm 2300 rotates to the right and the reverse movement controlling circuit (β') and the reverse movement flow controlling circuit (β") are closed. The solenoid 549b in pilot valve 54B and the solenoid 2230b in flow control valve 2420 conduct current simultaneously. The oil path will be:

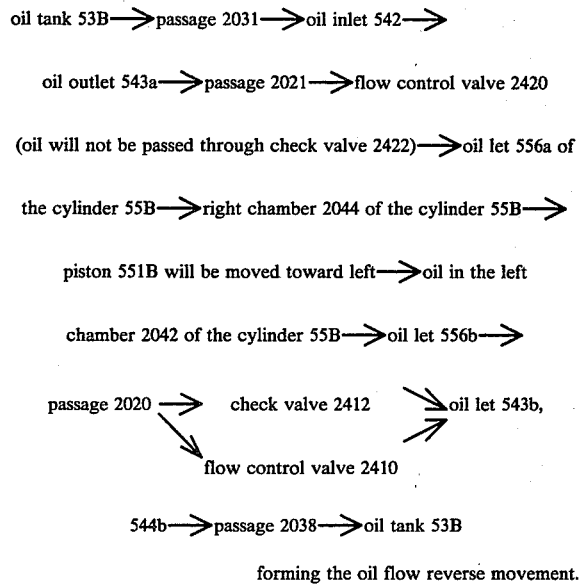

forming the oil flow reverse movement.

The piston rod 552 will drive the controlled object 1020 to move leftward. The third pivot point 2304 of the E type rocker arm 2300 touches back slide contacting plates 43b", the current passing the solenoid 2230b of the flow control valve 2420 changes accordingly. The movement speed of the piston 551B is controlled accordingly.

In FIG. 15, the check valves 2412, 2422 are so arranged that the oil flow of the cylinder 55B is meter in controlled. If meter out control is needed, the check valves must change their block direction and interchange the hydraulic forward movement flow controlling circuit (α") with the reverse movement flow controlling circuit (β"). The operation will be the same to that of the system in FIG. 15 and shall not be detailed.

In the embodiment of the system for positioning following in FIG. 15, if properly adjust the positions where the slide contacting plates 43a", 43B" connected to the resistors 44a, 44b, a perfect deceleration as that of dotted line C in FIGS. 5 and 6 may be obtained, no shock and over shoot will occur. If the controlled object 1020 should once passes position C' and C" the reverse circuit (β') and the circuit (β") will be closed simultaneously, it will return to C' as that has been explained in the embodiment of FIG. 8 and has an accurate stopping position. It is to be reminded that the conventional machines adopts mechanical mechanisms such as came or other dogs for controlling the oil flow in the passage or the oil cylinder and it is always difficult to have an accurate design for the dogs in order to obtain deceleration to avoid shock and over shoot. However, in the present invention, it is so simple to adjust or change the connection place between the slide contacting plates 43a", 43b" and variable resistor 44a, 41b. Besides, the position of the demanding object 1030 may be easily moved by sliding the contacting plate 1031 on the resistor 1010. In addition, the position of the controlled object 1020 may be easily changed only by changing the contacting position of the demanding object 1030 on resistor 1011, thus changing the current strength input into amplifier 31, thus changing the current strength into the amplifier 31 may be achieved by remote control or achieved automatically using N.C. (numerical control) or other automatic machine. It is still to be noted that the cross section area of the oil passages 2020, 2021 may be increased for speedy the movement of the controlled object. The present invention may be used as a servo mechanism which will never be influenced by temperature or pressure change of the hydraulic oil or by the moisture or dust contained in the hydraulic oil. And most important feature is that the present invention is used as a servo mechanism of low transfer function.

Figure 16:
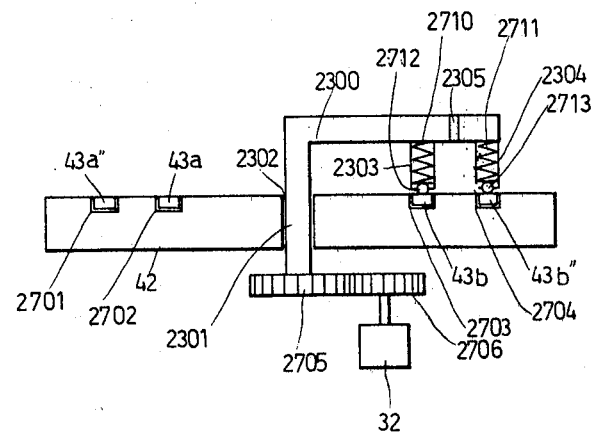
FIG. 16 is a sectional view of the controlling switch in FIG. 15.

The structure of the controlling switch of the present invention in FIG. 15 is shown as a sectional view in FIG. 16. There are four arc recesses 2701, 2702, 2703 and 2704, formed on the body of the controlling switch 42 for the insertion of the slide contacting plate 43", conductors 43a, 43b, and the slide contacting plate 43b" respectively. The first pivot point 2301 of the E type rocker arm 2300 passes through the central opening 2302 thereof and connected to a gear 2705 which is teethed by another gear 2706 of the servo motor 32. The second pivot point 2303 and the third pivot point 2304 are insulated by an insulating plate 2305 having a steel ball 2712 and 2713 provided on the tip portion thereof. The steel ball 2712 and 2713 are supported and energied by the springs 2710 and 2711 to touch with the conductors 43a, 43b and the slide contacting plates 43a", 43b".

Figure 17:
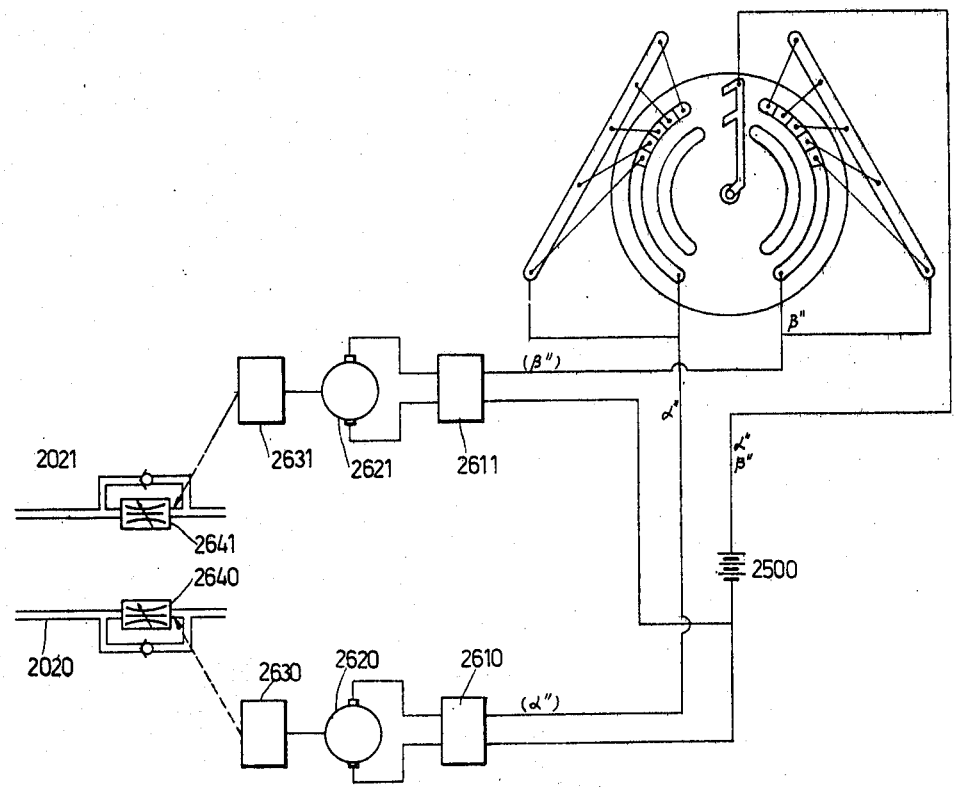
FIG. 17 shows a circuit diagram embodiment for position following using mechanical flow control valve.

The electromagnetic flow control valve used in the above mentioned embodiment may be substituted by a mechanical flow control valve and is best illustrated in the system of FIG. 17. It is to be noted that the system in FIG. 17 is a simplified system of that of FIG. 15 and only the flow control valve portion is illustrated. The hydraulic forward movement circuit (α'), reverse movement circuit (β') and the pilot valve structure are identical to that of FIG. 10 or FIG. 15. The hydraulic forward movement flow controlling circuit (α") provides electric current to the solenoid 2230a of the flow control valve illustrated in FIG. 12 in the system of FIG. 15. But the same circuit (α") provides electric current to the amplifier 2610 in FIG. 17. The change of current is fed to the amplifier 2610 for driving the valve shaft 2121 of the valve dwell 2120 of the flow control valve 2640 illustrated in FIG. 11 through the servo motor 2620 and the reduced gear means 2630. The valve shaft 2121 is rotated leftward or rightward to change the magnititude of oriffice 2123 and the flow rate of the oil in the passage 2020 in controlled. Similarly, the current in the hydraulic reverse movement flow controlling circuit (β') is fed to the amplifier 2611 for driving the rotation of the valve dwell of the flow control valve 2641 through the servo motor 2621 and the reduced gear means 2631. The flow rate of the oil in the passage 2021 is controlled and the controlled object may have the best and deceleration.

Figure 18:
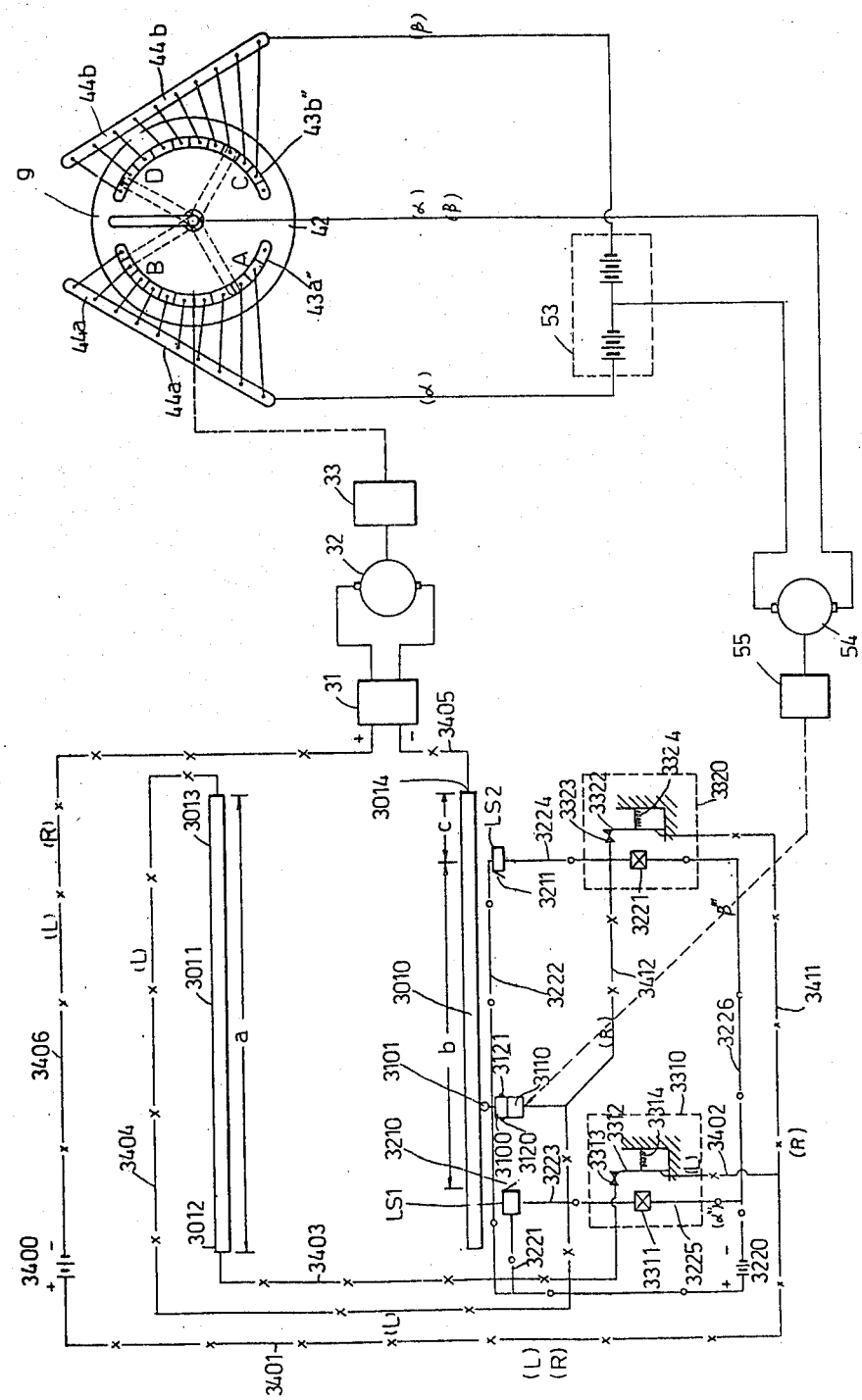
FIG. 18 shows an embodiment of the reciprocating motion automatic control system using reversible motor as the manipulating means.

Having disclosed the automatic control system for position following of the controlled object hereinabove, we now go to the description of the reciprocating motion of a controlled object between two positions which is shown in FIG. 18. The purpose of the system in FIG. 18 is using a reversible motor as manipulating means to control a controlled object travelling to and fro between two position forming a reciprocating motion and the motion speed of the controlled object at each position on its path can also be controlled. Referring to FIG. 18, the controlled object is slidably contacting the resistor and moves to and fro between two limit switches LS1 and LS2. When the limit switch LS1 is on and the limit switch LS2 will be off and vise versa. When the controlled object moves from LS1 to LS2, the rocker arm 41″ in a controlling switch of FIG. 7 rotates from the end of the slide contacting plates 43a″ toward the gap g. If the controlled object moves from LS2 to LS1, the rocker arm 41″ rotates from the end of the slide contacting plates 43b″ toward the gap g. By properly adjusting the connecting position of the slide contacting plates 43a″, 43b″ to the resistors 44a, 44b, the moving speed of the controlled object at each position during the path of the reciprocating motion can be controlled by the different current strength fed to the driving motor 54.

In FIG. 18, the reciprocating motion system comprises a resistor 3010, a resistor 3011 and a controlled object 3110 driven by the reversible motor 54 described in FIG. 7 through a reduced gear means 55 to move leftward or rightward along the resistor 3010. A switch 3100 is equipped on the controlled object 3110 having a contacting plate 3101 formed theeon for slidably contacting the resistor 3010. Therefore the contacting plate 3101 will move leftward or rightward on the resistor 3010 corresponding to the movement of the controlled object 3110. A pair of limit switches LS1 and LS2 are provided on the ends of the resistor 3010. The resistance of the resistor between two limit switches LS1, LS2 is b, the resistance of the resistor 3010 between LS2 and the end 3014 is c, and the resistance 3011 is a. Limit switches LS1 and LS2 have a contactor 3210 and 3211 respectively to be contacted by a pair of protrusions 3120 and 3121 on the switch 3100 when controlled object 3110 touches limit switch LS1 or LS2. When one of the contactor 3210 or 3211 touches with one of the protrusion 3120 or 3121, suppose LS1 is on, LS2 will be off. As controlled object 3110 departs from LS1, LS1 will remain on. When LS2 becomes on, in the mean time LS1 will become off.

A pair of relays 3310 and 3320 each consists of a solenoid 3311 or 3321, a fixed contacting plate 3313, or 3323, a spring 3314 or 3324 and a moving contacting plate 3312 or 3322. If the solenoid 3311 or 3321 does not conduct current, the moving contacting plate 3312 or 3322 is pulled by the spring 3314 or 3324 without in touch with the fixed contacting plate 3313 or 3323. When the solenoid 3311 or 3321 conducts current, the produced electromagnetic force will attract the moving contacting plate 3312 or 3322 to be in touch with the fixed contacting plate 3313 or 3323.

From the positive terminal of the power source 3220, there are lead wires 3221 and 3222 connected to the positive terminals of the limit switches LS1 and LS2. The negative terminals of limit switches LS1 and LS2 are connected to the positive terminals of the solenoid 3311 and 3321 through wires 3223 and 3224. And the negative terminals of the solenoid 3311 and 3321 are connected to the negative terminal of power source 3220 through wires 3225 and 3226. The above circuitry forms a left relay controlling circuit ($\alpha'''$) and a right relay controlling circuit ($\beta'''$) wherein the lead wires are better denoted by $\_\_\circ\_\_\circ\_\_$.

From the positive terminal of the power source 3400, there are wires 3401 and 3402 connected to the moving contacting plate 3312 of the relay 3310. A wire 3403 connects the fixed contacting plate 3313 of the relay 3310 to the end 3012 of the resistor 3011. A wire 3404 connects the end 3013 of the resistor 3011 to the contacting plate 3101. A wire 3405 connects the end 3014 of the resistor 3010 to the negative terminal of the amplifier 31 in FIG. 7. From the positive terminal of the amplifier 31, a lead wire 3406 connects to the negative terminal of the power source 3400. The above stated circuitry forms the left rotation circuit (L) of the rocker arm 41″. On the contrary, another circuitry from positive terminal of power source 3400→wire 3401→wire 3411→moving contacting plate 3322 of the relay 3320, from the fixed contacting plate 3323 of the relay 3320→wire 3412→contacting plate 3101→resistor 3010→wire 3405→amplifier 31→wire 3406→negative terminal of power source 3400 forms the right rotation circuit (R) of the rocker are 41″. The left and right rotation circuit (L) (R) is best denoted by $\_x\_x\_x\_$.

When the protrusion 3120 of the switch 3100 touches the contacting plate 3210 of the limit switch LS1 in the left moving stroke of the controlled object 3110, the limit switch LS1 will be ON and the limit switch LS2 OFF. The right relay controlling circuit ($\beta'''$) is OFF and no current flows in the solenoid 3321. The moving contacting plate 3322 does not touch the fixed contacting plate 3323 and the right rotation circuit (R) is opened. Because the limit switch LS1 is ON, the left relay controlling circuit ($\alpha'''$) is closed and there is current flowed in the solenoid 3311 of the relay 3310. The attractive force of the solenoid 3311 makes the moving contacting plate 3312 touch the fixed contacting plate 3313 and thus the left rotation circuit (L) is closed. The current introduced to the amplifier 31 from the power source 3400 passes the resistor 3011 (its resistance is a) and resistor 3010 (its resistance is b+c). The total resistance is a+b+c and the rocker arm 41″ stops at the position A of the slide contacting plates 43a″. The motor forward rotation controlling circuit ($\alpha$) is closed and the motor 54 described in FIG. 7 drives the controlled object 3110 to move rightward through a reduced gear means 55. When the controlled objects 3110 moves from LS1 to LS2, LS1 still maintain ON, the resistance b of the resistor 3010 reduces gradually and the rocker arm 41″ of the controlling switch 42 rotates from position A toward the gap g. When the controlled object 3110 almost reach the limit switch LS2 (not in touch with the contacting plate 3211 of the limit switch LS2), the current introduced to the amplifier 31 passes a total resistance of a+c (b→o) and the rocker arm 41″ comes to the position B of the slide contacting plate 43a″ without going into the gap g as the proportion of a:b:c is well adjusted.

When the protrusion 3121 of the switch 3100 touches the contacting plate 3211 of the LS2, the limit switch LS2 will be ON and LS1 be OFF. The left relay controlling circuit ($\alpha'''$) becomes opened and no current flows in the solenoid 3311 of the relay 3310. The moving contacting plate 3312 departs from the fixed contacting plate 3313 by the force of the spring 3314 and the left rotation circuit (L) of the rocker arm 41″ is opened. Now because the limit switch LS2 is on, so the right relay controlling circuit ($\beta'''$) becomes closed. Current flows in the solenoid 3321 of the relay 3320 and the moving contacting plate 3322 touches the fixed contacting plate 3323 and thus the right rotation circuit (R) of the rocker arm 41″ is closed. The total resistance the current passes from the power source 3400 to the amplifier 31 becomes c from a+c at once, and the rocker arm 41" of the controlling switch 42 rotates rapidly to the position C on the slide contacting plate 43b" from position B by the driving of the servo motor 32 and the reduced gear means 33. The motor reverse rotation controlling circuit (β) is closed and the reversible motor 54 starts to drive the controlled object to move leftward from LS2 to LS1. When the controlled object moves along the resistor 3010 (LS2 remains ON), the resistance increases gradually (b. increases) and therefore the rocker arm 41" rotates from the position C toward the gap g along the slide contacting plate 43b". When the controlled object almost touch the LS1 (not in touch with the contacting plate 3210 of the limit switch LS1), the current passes a total resistance of c+b (b will increase to maximum from zero) and the rocker arm 41" comes to the position D of the slide contacting plate 43b" without going into the gap g.

When the protrusion 3120 of the switch 3100 touches the contacting plate 3210 of the LS1, the LS1 again becomes ON, LS2 becomes OFF, and the left rotation circuit (L) becomes closed. The total resistance the current passes from the power source 3400 to the amplifier 31 becomes a+b+c from c+b at once and the rocker arm 41" rapidly moves to the position A of the slide contacting plate 43a" from D. The controlled object 3110 again moves in the direction from LS1 to LS2 and the rocker arm 41" of the controlling switch 42 rotates from position A to position B.

Figure 19:
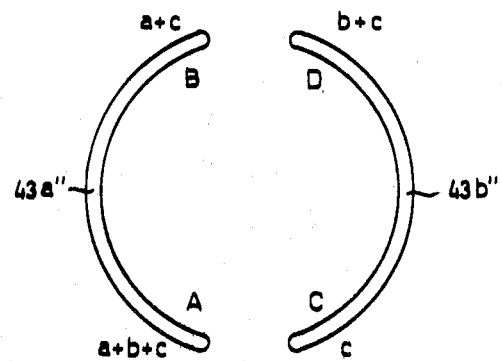
FIG. 19 shows the relation between the resistance and the contact position of the slide contacting plate.

It is to be summarized that the embodiment of the system of reciprocating motion in FIG. 18 introduces a current from the power source 3400 to the amplifier 31 to pass a total resistance of a+b+c and the rocker arm 41" is at position A. The controlled object 3110 then moves from LS1 to LS2 with the resistance a+b+c decreases until b→o and the rocker arm 41" rotates from position A to position B. As soon as the protrusion 3121 touches LS2, the resistance decreases to a valve of C and the rocker arm 41" rotates to a position C on the slide contacting plate 43b". The controlled object 3110 then moves from LS2 to LS1 with the resistance increased to a valve of c+b, and the rocker arm 41" rotates from position C to position D. As soon as the protrusion 3120 of the switch touches the limit switch LS1, the resistance becomes to a+b+c again and the rocker arm 41" rotates to position A, and the section of the resistance a. b. c. on the resistor 3010 and 3011 may be well adjusted that the rocker arm 41" will slide between A and B on slide contacting plate 43a", and C and D on slide contacting plate 43a" without going into gap g. The above summary may be better understood with reference to FIG. 19.

As a matter of fact, we may preset the section of the resistance a, b, c on the resistor 3010 and 3011 to satisfy the following requirements.

(1) when the rocker arm 41" rotates from A to B, the decrease in the value of resistance is:

$$(a+b+c)-(a+c)=b$$

(2) when the rocker arm 41" rotates from C to D, the increase in the value of resistance is:

$$(c+b)-c=b$$

Because the controlled object moves between LS1 and LS2 and the difference in the resistance change (decrease or increase) is both b, it will satisfy the requirement.

(3) suppose the voltage of the power source 3400 is E, then the current introduced to the amplifier 31 at dufferebt position will be:

| position A | $I_1 = E/a + b + c$ |
|---|---|
| position B | $I_2 = E/a + c$ |
| position C | $I_3 = E/C$ |
| position D | $I_4 = E/b + c$ |

Because the rocker arm 41" should not fall to the gap g, it means the current at position B must be less than that of position D.

$$I_2 < I_4\ E/a+c < E/b+c$$

Therefore b+c<a+c i.e. b<a.

It is to be noted that the controlling switch 42 used in the system of FIG. 18 is somewhat different from that in the system of FIG. 8 or FIG. 15. The prior controlling switch comprises the slide contacting plates only at the position near the gap g. However, the controlling switches in the present embodiment comprises an entire slide contacting plates 43a", 43b". This means, if we properly adjust the connection place between the slide contacting plate 43a", 43b" to the resistor 44a, 44b, the moving speed of the controlled object at each position during the path from LS1 to LS2 or LS2 to LS1 may be controlled by imputing different current strength to the reversible motor 54.

From the embodiment shown in FIG. 18, it is understood any particular speed characteristics of the controlled object making reciprocating motion may be obtained. All we have to do is to properly connect the slide contacting plates 43a", 43b" to the resistor 44a, 44b and the adjustment is very simple. Because there is no any mechanical mechanism involved, the present system is simple in structure having no noise, no frictions and besides, the output power is directed from reversible motor 54 and will not be limited.

Figure 20:
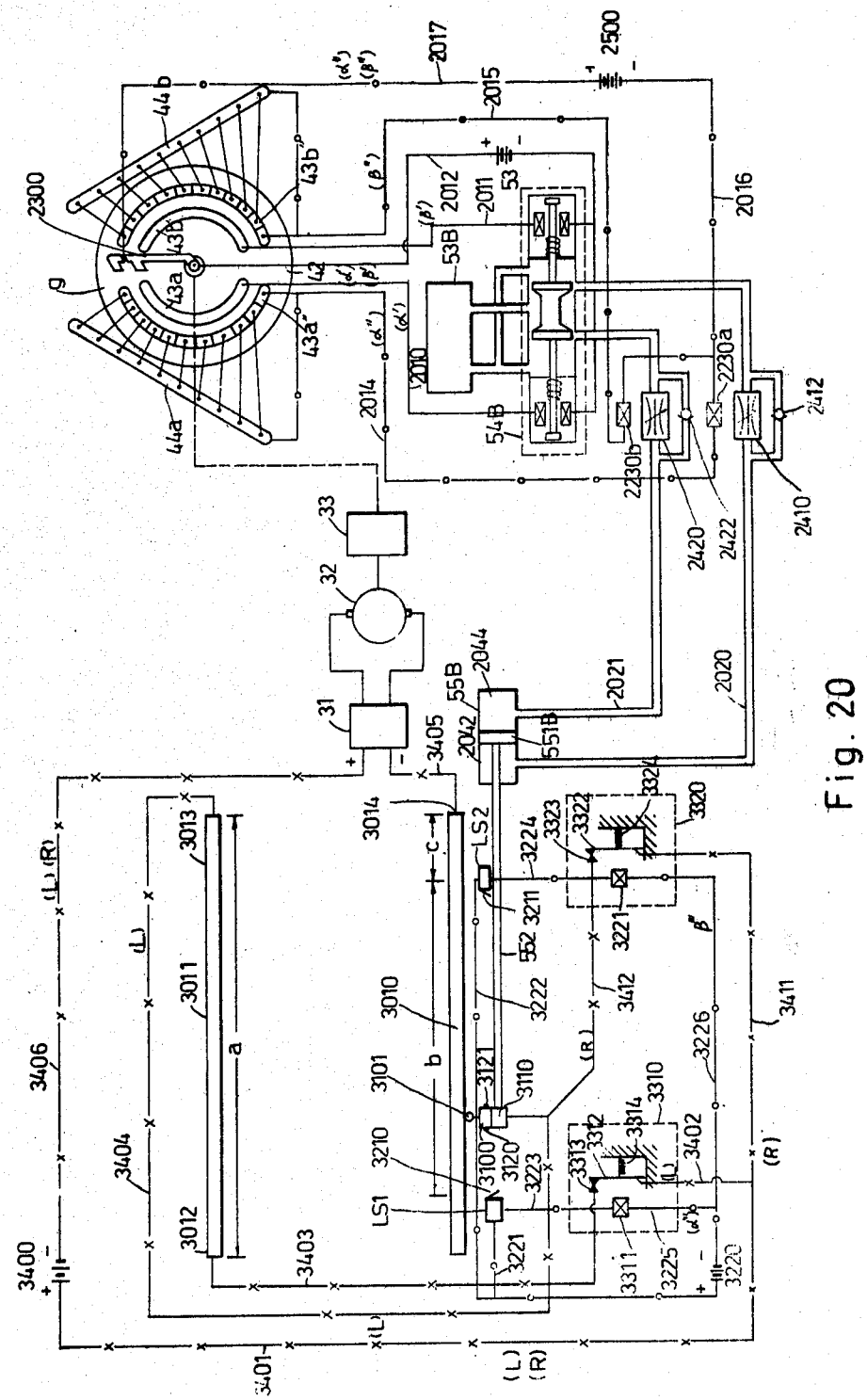
FIG. 20 shows an embodiment of the reciprocating motion automatic control system using hydraulic manipulating means.

The manipulating means for an automatic control system of reciprocating motion may also adopt hydraulic manipulating means with a better embodiment shown in FIG. 20. The purpose and the operation theory of the system in FIG. 20 is identical to that of the system in FIG. 18 for a controlled object to have a desired moving speed at each position on the path of reciprocating motion. The left moving or right moving of the controlled object 3110 makes the resistance b of the resistor 3010 change. And the servo motor 32 will rotate leftward or rightward to drive the E type rocker arm 2300 of the controlling switch 42 rotate leftward or rightward through a reduced gear means 33. And thus control the ON-OFF of the solenoid 549a or 549b and the current change of the solenoid 2230a or 2230b of the flow control valve. The moving direction and speed of the piston 551B in the cylinder 55B is controlled. The controlled object 3110 is then driven by the piston 551B and has a presetted speed character on the path of the reciprocating motion.

In FIG. 20, the structure of the controlled object 3110, switch 3100, a pair of resistors 3010 and 3011, limit switches LS1, and LS2, relays 3310, 3320 and the corresponding left or right relay controlling circuit (α''') (β''') and the left or right rotation circuit (L) (R) of the rocker arm are identical to those in the system of FIG.

18. The pilot valve 54B, electromagnetic flow control valve 2420, 2410, cylinder 55B, the corresponding hydraulic forward or reverse movement circuit ($\alpha'$) ($\beta'$) and the forward or reverse movement flow controlling circuit ($\alpha''$) ($\beta''$) are identical to those in the system of FIG. 15. The controlling switch 42 and the E type rocker arm 2300 are substantially same to that in the system of FIG. 15 except the slide contacting plates 43$a''$, 43$b''$ are entirely sectioned.

The reciprocating motion of the controlled object 3110 driven by the piston rod 552 of the cylinder 55B between limit switches LS1, LS2 is perfectly identical to that of the system in FIG. 18. By properly connecting the slide contacting plates 43$a''$, 43$b''$ to the resistors 44$a$, 44$b$, the flow rate of the oil passing the oil passages 2020, 2021 is controlled and so is the moving speed of the controlled object at each position on the path of reciprocating motion.

The system in FIG. 20 is a very simple system for reciprocating motion of a controlled object. Any speed characteristic may be easily obtained by properly connecting the slide contacting plate 43$a''$, 43$b''$ to the resistors 44$a$, 44$b$. Besides, using hydraulic manipulating means will have a large output driving power and have no disadvantage of inertia.

It is to be noted that cylinders 55B and hydraulic forward or reverse movement circuit ($\alpha'$) ($\beta'$) and the flow controlling circuit ($\alpha''$) ($\beta''$) are employed in the embodiment of the system shown in FIGS. 10, 15 and 20. In fact, the hydraulic oil used in said systems may be substituted by the compressed air and it will function the same effect. Further, in the embodiment of said position following and reciprocating motion, a pair of resistor 1010, 1011 or 3010, 3011 are used as detecting material of position. In reality, potential meter, differential transformer, inductron, synchro generator may be used to attain same goal.

In summary, the automatic control system of position following according to the present invention is an ideal system and may be applied to many applications. In the present application, only the "positioning mechanism", "deceleration valve" and "servo valve" have been adopted as examples for illustrating the invention.

The conventinal working machine using reversible and constant speed motor to actuate a controlled object to move left or right, must be equipped with braking means to stop the object because the motor and the controlled object have inertia. However, the system of the present invention does not need the braking means, as illustrated in FIG. 8, the controlled object 1020 will decelerate automatically before stopping position C'.

The present invention system may be used as a motor-drived or hydraulic copy machine. The demanding object 1030 moves along the model template, and the knife (controlled object 1020) will follow the movement of the demanding object 1030. Besides, the present invention may also used as a Digital Cylinder, with the current change substituted by the digital signals. It is, therefore the present invention may be used in every kind of position control and have a high accuracy stopping position, rapid response time and less ossilation.

The present invention may adopt any kind of driving power such as reversible motor, Ward Leonard System, hydraulic, compressed air etc.. It is easy to set the stopping position. Response is quick and there will be no ossilation. It is also easily to be manufactured, maintained and utilized. Besides, the setting of stopping position may be remotely or automatically controlled and can be deemed as a revolutional improvement.

What I claim is:

1. Automatic position following control apparatus for controlling a controlled object to follow a demand object, said apparatus comprising:

means for producing a control signal corresponding to the difference in position between the controlled object and the demand object, said control signal producing means comprising a signal source connected in series with first and second variable resistances each having a fixed contact and a movable contact, said first and second variable resistances being series connected with each other such that said fixed contact of said first resistance is connected to said movable contact of said second resistance, and the controlled object and demand object being coupled to respective ones of said first and second resistance movable contacts for conjoint movement therewith such that the resistance, and thus the output, of the circuit formed by said signal source and said first and second resistances is dependent on the respective positions of the controlled object and the demand object;

means for converting said control signal into a displacement corresponding to said control signal;

drive means controllable to drive the controlled object in a selected one of two directions; and control switch means responsive to said signal converting means for controlling said drive means.

2. The apparatus of claim 1 wherein said signal converting means comprises a servo motor responsive to said control signal and said control switch means comprises a movable arm responsive to said servo motor, and first and second conductor members separated from each other by an intermediate insulating gap and symmetrically disposed with respect to said movable arm such that movement of said arm in a first direction from a central position in alignment with said gap and corresponding to the position of the demand object will bring said arm into contact with said first conductor member and movement of said arm in a second direction from said central position will bring said arm into contact with said second conductor member.

3. The apparatus of claim 2 wherein said conductor members each comprise a series of separate, electrically conductive first contact regions electrically insulated from each other at the end of said conductor member that is adjacent said gap, and an electrically conductive second contact region forming the remainder of the conductor member, and further including first and second resistances associated with said first and second conductor members, respectively, connected to corresponding inputs of said drive means to drive the controlled object in a respective one of said two directions, each of said first contact regions being electrically connected at a predetermined resistance position on the corresponding one of said resistances, and each of said second contact regions being electrically connected directly to the corresponding one of said drive means inputs, such that the magnitude of the power supplied to said drive means varies in dependence on the degree of movement of said arm over a first range and is constant over a second range of movement which is greater than said first range.

4. The apparatus of claim 3 wherein said first contact regions are connected to the respective first and second resistances at resistance positions such that the power supplied to the drive means varies non-linearly over said first range.

5. Automatic positional control apparatus for controlling the position of a controlled object comprising:
means for producing a control signal corresponding to the relative position of the controlled object with respect to a desired position;
means for converting said control signal into a displacement corresponding to said control signal;
drive means controllable to drive the controlled object in a selected one of two directions and at a predetermined speed; and
control switch means responsive to said signal converting means for controlling said drive means, said control switch means comprising:
a movable arm responsive to said signal converting means electrically connected to a power source;
first and second contact members separated from each other by an intermediate insulating gap and symmetrically disposed with respect to said movable arm such that movement of said arm in a first direction from a central position in alignment with said gap and corresponding to the desired position of the control object will bring said arm into contact with said first contact member and movement of said arm in a second direction from said central position will bring said arm into contact with said second contact member, each of said contact members comprising a series of separate, electrically conductive first contact regions electrically insulated from each other formed at the end of the contact member adjacent said gap, and an electrically conductive second contact region forming the remainder of the contact member;
first and second resistances associated with said first and second contact members, respectively, connected to corresponding inputs of said drive means to drive the controlled object in a respective one of said two directions, each of said first contact regions being electrically connected at a predetermined resistance position on the corresponding one of said first and second resistances, and each of said second contact regions being electrically connected directly to the corresponding one of said drive means inputs, such that the magnitude of the power supplied to said drive means varies in dependence on the degree of movement of said movable arm over a first range of movement in either direction and is constant over a second range of movement which is greater than said first range of movement in either direction.

6. The apparatus of claim 5 wherein said signal converting means comprises a servo motor producing an angular displacement, said movable arm is drivingly coupled to said servo motor for pivoting movement, and said first and second contact members are arcuately shaped.

7. The apparatus of claim 5 wherein said first contact regions are connected to the respective first and second resistances at resistance positions such that the power supplied to the drive means varies non-linearly over said first range.

8. The apparatus of claim 5 wherein said control signal producing means comprises a potential meter, differential transformer, inductron, synchro resolver, computing condensor or tachometer generator.

9. The apparatus of claim 5 wherein said drive means comprises a reversible motor.

10. The apparatus of claim 5 wherein said drive means comprises a Ward Leonard System.

11. The apparatus of claim 5 wherein said drive means comprises a hydraulic driving system having a piston rod connected to the controlled object such that controlling the movement of said piston controls the movement of the controlled object.

12. The apparatus of claim 11 wherein said hydraulic driving system further comprises a pilot valve with a pair of solenoids disposed at two ends of the piston rod of the pilot valve such that when the solenoids are energized, the piston rod will be caused to move in either direction to change the flow direction of the hydraulic fluid in said hydraulic driving system.

13. The apparatus of claim 11 wherein said power source comprises a source of compressed air.

14. The apparatus of claim 11 wherein said hydraulic driving system further comprises a cylinder disposed at the end of the pilot valve and controlled thereby; said piston rod connected to the controlled object being disposed in said cylinder and controlled by the flow direction of the hydraulic fluid.

15. The apparatus of claim 11 wherein said hydraulic driving system further comprises a pair of electric flow control valves disposed on the ingoing and outgoing fluid passages of said cylinder for controlling the flow rate of the fluid passage.

16. The apparatus of claim 15 wherein said flow control valve is electromagnetic and comprises a valve body; a pair of fluid inlets and outlets; a valve chamber receiving a valve rod with one end thereof formed into a narrow portion and a head portion sleeved by a spring to be pressed by a ring on the narrow portion; a solenoid provided on the narrow portion; and an orifice formed between the notch of the valve rod and the valve chamber such that when the electric current strength in the solenoid changes, the valve rod will be moved left or right and will modulate the magnitude of the orifice to control the flow rate of the hydraulic fluid passing therethrough so that the movement speed of the controlled object can be controlled.

17. The apparatus of claim 15 wherein said flow control valve is mechanical and comprises a valve body; a pair of fluid inlets and outlets; a valve dwell substantially in the shape of a cylinder disposed in a valve chamber of the valve body; the valve dwell having a rotation shaft protruding out of the valve body and connected to the rotational axis of a servo motor forming part of said signal converting means; the valve dwell further having a cutout plane, and an orifice formed between the cutout plane and the valve chamber such that the magnitude of the orifice will be modulated by the rotation of said servo motor to control the flow rate of the hydraulic fluid passing therethrough, and thus the movement speed of the controlled object.

18. The apparatus of claim 16 wherein said solenoid of the flow control valve is connected to a hydraulic forward or reverse movement flow controlling circuit.

19. The apparatus of claim 17 wherein said control signal producing means is connected to said hydraulic forward or reverse movement flow controlling circuit and said servo motor is rotated in accordance with said control signal.

20. The apparatus of claim 15 wherein said flow control valve is disposed on the outgoing fluid passage of said cylinder for achieving meter out control.

21. The apparatus of claim 15 wherein said flow control valve is disposed on the intaking fluid passage of said cylinder for achieving meter in control.

22. The apparatus of claim 15 wherein said control switch means further comprises:
a pair of inner arc conductors symmetrically disposed with respect to said movable arm and having an insulating gap therebetween for cooperating with said movable arm to control hydraulic forward movement and reverse movement controlling means forming a part of said drive means;
said movable arm having a first contact for contacting said first and second contact members and a second contact insulated from said first contact for contacting said inner arc conductors; and
said flow control valves constitute said drive means inputs to which said resistances and said second contact regions are respectively connected, such that when said movable arm rotates leftward or rightward said hydraulic forward movement and reverse movement means and the corresponding flow rate controlling circuit are actuated simultaneously.

23. The apparatus of claim 22 wherein said first and second movable arm contacts comprise spring mounted steel balls for slidably contacting said contact members and said inner conductors, respectively.

* * * * *